T. SKELTON.
HORSESHOES.
No. 195,410. Patented Sept. 18, 1877.
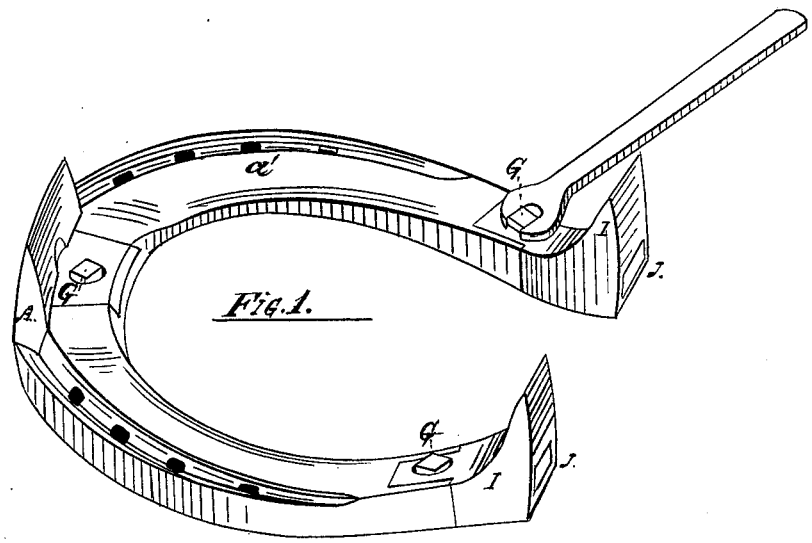
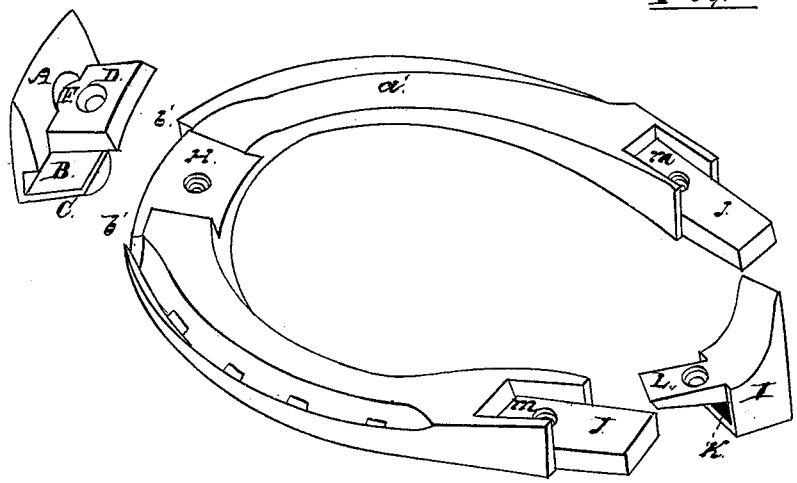
WITNESSES:
A. H. Schattenberg
D. G. Stuart
INVENTOR:
Thomas Skelton
By Jas. B. Erwin
Attorney

UNITED STATES PATENT OFFICE.

THOMAS SKELTON, OF MILWAUKEE, ASSIGNOR OF ONE-HALF HIS RIGHT TO CHARLES KOEHM, OF PAYNESVILLE, WISCONSIN.

IMPROVEMENT IN HORSESHOES.

Specification forming part of Letters Patent No. 195,410, dated September 18, 1877; application filed February 5, 1877.

*To all whom it may concern:*

Be it known that I, THOMAS SKELTON, of the city of Milwaukee, in the county of Milwaukee and State of Wisconsin, have invented certain new and useful Improvements in Horseshoes; and I do hereby declare that the following is a full, clear, and exact description thereof, which will enable others skilled in the art to which it appertains to make and use the same, reference being had to the accompanying drawings, and to letters of reference marked thereon, which form a part of this specification.

The object of my invention is to furnish a horseshoe the calks of which may be removed when they become dull or worn, and replaced by new ones, without taking the shoe from the hoof of the horse, the calks and shoe consisting of separate pieces of metal, which are united together by mortise and tenon, and are held securely in their places by a screw, all of which is more fully explained by reference to the accompanying drawings, of which—

Figure 1 is a perspective view of the shoe with calks adjusted ready for use. Fig. 2 represents a perspective view of the shoe with calks removed.

A is the toe-calk of the shoe, which is attached to the shoe A' by means of lip C and dovetail tenon D, which is closely fitted to the dovetail mortise H, through which tenon there is a screw-hole, F, for the screw G. The hole F is countersunk deep enough to accommodate about one-half the head of the screw G. The countersink, fitting closely to the corners of the screw-head, tends to prevent the screw from turning and becoming loose. All side strain of the calk A is resisted by the bearing b' and b', between which it is set.

When the toe-calk is adjusted, as shown in Fig. 1, a double joint is formed—one by the union of the dovetail mortise H and tenon D, and the other by the lip C and tenon D—by which the calk is clamped firmly above and beneath the shoe, by which arrangement all the strain is resisted by the peculiar adjustment of the parts, the screw G serving principally to keep the parts together. The heel-calks I are attached to the shoe by inserting the tenon J into the mortise K and the lip or tenon L into the mortise m, when the screw G is inserted, and the calks are thus held firmly in their places. By this arrangement the horse's hoof is brought directly in contact with the calks, they being on the same plane with the upper side of the shoe.

The calks, when worn, may be readily removed and replaced by new ones by a common laborer, without detaching the shoe from the hoof, by drawing the screw G.

For practical purposes I prefer to make the shoe by casting, then make it malleable by the ordinary annealing process.

The calks I make of ordinary cast-steel. I make no claim, however, to the kind of metal used.

Having thus described my invention, what I claim, and desire to secure by Letters Patent, is—

1. The shoe A', having bearings b' b', dovetail mortise H, mortise m m, tenon J, and screw-hole F, substantially as shown and described.

2. Toe-calks A, having dovetail lip or tenon D, screw-hole F, mortise B, and lip C, substantially as shown and described.

3. Heel-calks I, having mortise K, lip or tenon L, and screw-hole F, substantially as shown and described.

4. The combination of the shoe A', calks A, and calks I, secured by screws G, all substantially as shown and described.

In testimony that I claim the foregoing as my own I affix my signature in presence of two witnesses.

THOMAS SKELTON.

Witnesses:
K. SHAWVAN,
J. ERWIN.